United States Patent
Stridkvist et al.

(10) Patent No.: US 11,751,041 B2
(45) Date of Patent: Sep. 5, 2023

(54) SYNCHRONIZATION OF AUXILIARY ACTIVITY

(71) Applicant: Nordic Semiconductor ASA, Trondheim (NO)

(72) Inventors: Johan Stridkvist, Trondheim (NO); Jan Müller, Trondheim (NO)

(73) Assignee: NORDIC SEMICONDUCTOR ASA, Trondheim (NO)

( * ) Notice: Subject to any disclaimer, the term of this patent is extended or adjusted under 35 U.S.C. 154(b) by 1 day.

(21) Appl. No.: 17/538,993

(22) Filed: Nov. 30, 2021

(65) Prior Publication Data
US 2022/0174470 A1 Jun. 2, 2022

(30) Foreign Application Priority Data

Dec. 1, 2020 (FI) .................................... 20206229

(51) Int. Cl.
*H04W 8/00* (2009.01)
*H04W 76/10* (2018.01)
*H04W 56/00* (2009.01)
*H04W 88/06* (2009.01)

(52) U.S. Cl.
CPC ......... *H04W 8/005* (2013.01); *H04W 56/001* (2013.01); *H04W 88/06* (2013.01)

(58) Field of Classification Search
CPC ... H04W 8/005; H04W 56/001; H04W 88/06; H04W 56/0015; H04W 76/14; H04W 4/80; H04W 4/20; H04W 4/06; H04W 48/08; H04W 48/16; H04W 76/11; H04W 4/23

See application file for complete search history.

(56) References Cited

U.S. PATENT DOCUMENTS

| | | | |
|---|---|---|---|
| 2013/0230022 A1* | 9/2013 | Guo | H04W 36/0066 370/331 |
| 2016/0100311 A1* | 4/2016 | Kumar | H04W 12/06 726/7 |
| 2017/0054787 A1* | 2/2017 | Kwon | H04W 8/005 |
| 2018/0249310 A1 | 8/2018 | Kim et al. | |

(Continued)

OTHER PUBLICATIONS

Finnish Search Report for FI-00091 dated Jul. 2, 2021, 2 pages.

(Continued)

*Primary Examiner* — Andrew Wendell
(74) *Attorney, Agent, or Firm* — Nixon & Vanderhye PC

(57) ABSTRACT

According to an aspect, there is provided a first radio device comprising means for performing the following. The first radio device transmits, using a connectionless mode, an advertising message. Subsequently, the first radio device receives, from a second radio device at a second reception time instance measured by the first radio device using the connectionless mode, a scan request. The first radio device transmits, to the second radio device, the scan response using the connectionless mode. Finally, the first radio device performs an auxiliary activity involving wireless communication between the first and second radio devices. The performing of the auxiliary activity is initiated at a first starting time defined to occur at a pre-defined time interval following an anchor point corresponding to the second reception time instance or to a subsequent timestamp generated in response to the receiving of the scan request at the second reception time instance.

20 Claims, 6 Drawing Sheets

(56) References Cited

U.S. PATENT DOCUMENTS

| | | |
|---|---|---|
| 2019/0006891 A1 | 1/2019 | Park et al. |
| 2020/0107262 A1* | 4/2020 | Shaw .................... H04W 76/11 |
| 2020/0379696 A1* | 12/2020 | Konji .................... G06F 3/1204 |
| 2022/0024415 A1* | 1/2022 | Wu ........................ E05F 15/73 |

OTHER PUBLICATIONS

Yousefi, et al., Analysis of time synchronization based on current measurement for Bluetooth Low Energy (BLE), 2017 $8^{th}$ IEEE Annual Information Technology, Electronics and Mobile Communication Conference (IEMCON). Vancouver, BC, Canada, Oct. 2017, pp. 602-607.

* cited by examiner

SYNCHRONIZATION OF AUXILIARY ACTIVITY

This application claims priority to FI Patent Application No. 20206229 filed Dec. 1, 2020 the entire contents of which are hereby incorporated by reference.

TECHNICAL FIELD

Embodiments described herein relate to wireless communications.

TECHNICAL BACKGROUND

A plurality of different communication protocols exist for enabling wireless communication between two or more radio devices such as two smart phones. For example, Bluetooth Low Energy may be used for implementing such communication functionality. However, such protocols necessarily place certain limitations on the functioning of the radio devices. Thus, it would be beneficial if alternative communication options would be available on top of the existing communication protocols to enable to more robust communication between radio devices while still maintaining compatibility with the specification of said existing protocols.

BRIEF DESCRIPTION

The invention is defined by the independent claims. Some embodiments are defined in the dependent claims.

According to a first aspect, there is provided a first radio device comprising:
at least one processor; and
at least one memory including a computer program code, wherein the at least one memory and the computer program code are configured, with the at least one processor, to cause the first radio device to perform:
transmitting, using a connectionless mode of the first radio device, an advertising message;
receiving, from a second radio device at a second reception time instance measured by the first radio device using the connectionless mode, a scan request requesting transmission of a scan response, wherein the second radio device is a device which received the advertising message;
transmitting, to the second radio device, the scan response using the connectionless mode; and
performing an auxiliary activity involving wireless communication between the first and second radio devices, wherein the performing of the auxiliary activity is initiated at a first starting time defined to occur at a pre-defined time interval following an anchor point corresponding to the second reception time instance or to a subsequent timestamp generated in response to the receiving of the scan request at the second reception time instance.

According to an example of the first aspect, the at least one memory and the computer program code are configured to, with the at least one processor, cause the first radio device perform:
maintaining, in a memory of the at least one memory, information comprising one or more of
at least one expected measurement latency of at least one reception time measurement defining the anchor point of the first radio device and/or defining an anchor point of the second radio device for timing start of the auxiliary activity,
at least one expected measurement uncertainty of at least one reception time measurement defining the anchor point of the first radio device and/or defining the anchor point of the second radio device for timing start of the auxiliary activity,
at least one time interval between the anchor point of the first radio device and the first starting time of the auxiliary activity for the first radio device and/or between the anchor point of the second radio device and a second starting time of the auxiliary activity for the second radio device,
a first transmission time instance measured by the first radio device and corresponding to the transmission of the advertising message and/or
a third transmission time instance measured by the first radio device and corresponding to the transmission of the scan response; and
adjusting, before the initiating of the auxiliary activity, the first starting time of the auxiliary activity and/or a tolerance of the first starting time based on said information for ensuring synchronized operation.

According to an example of the first aspect, the at least one memory and the computer program code are configured to, with the at least one processor, cause the first radio device to perform the auxiliary activity by at least:
transmitting one or more first auxiliary messages to the second radio device; and/or
receiving one or more second auxiliary messages from the second radio device.

According to an example of the first aspect, the at least one memory and the computer program code are configured to, with the at least one processor, cause the first radio device to perform:
generating, in response to the receiving of the scan request, a scan request received event, wherein the second reception time instance is measured by the first radio device by recording a timestamp of the scan request received event.

According to an example of the first aspect, the advertising message and/or the scan response comprises an identifier of the first radio device and the scan request comprises an identifier of the second radio device.

According to an example of the first aspect, the advertising message and/or the scan response comprises an identifier of the first radio device and the scan request comprises an identifier of the second radio device and the at least one memory and the computer program code are configured to, with the at least one processor, cause the first radio device further, in response to the receiving of the scan request, to perform:
generating a common identifier for a pair formed by the first and second radio devices based at least on the identifiers of the first and second radio devices; and
performing at least one of the following actions:
including the common identifier in the scan response,
transmitting one or more first auxiliary messages transmitted to the second radio device as a part of the auxiliary activity, wherein the one or more first auxiliary messages comprise the common identifier and
receiving one or more second auxiliary messages comprising the common identifier from the second radio device as a part of the auxiliary activity and verifying the one or more second auxiliary messages based on the generated common identifier.

According to an example of the first aspect, the advertising message and/or the scan response comprises an identifier of the first radio device and the scan request comprises an identifier of the second radio device and the at least one memory and the computer program code are configured to, with the at least one processor, cause the first radio device further to perform:

generating, in response to the receiving of the scan request, a common identifier for a pair formed by the first and second radio devices based at least on the identifiers of the first and second radio devices; and selecting one or more transmission characteristics of the first radio device for performing the auxiliary activity based on the common identifier.

According to an example of the first aspect, the first and second radio devices are devices supporting a first wireless communication protocol and the advertising message, the scan request, the scan response and any auxiliary messages involved in the auxiliary activity correspond to advertising protocol data units of said first wireless communication protocol, the auxiliary activity being auxiliary to primary operation of the first wireless communication protocol.

According to an example of the first aspect, the first and second radio devices are devices supporting a first wireless communication protocol and the advertising message, the scan request, the scan response and any auxiliary messages involved in the auxiliary activity correspond to advertising protocol data units of said first wireless communication protocol, the auxiliary activity being auxiliary to primary operation of the first wireless communication protocol, the first wireless communication protocol being Bluetooth Low Energy protocol.

According to a second aspect, there is provided a second radio device comprising:

at least one processor; and at least one memory including a computer program code, wherein the at least one memory and the computer program code are configured, with the at least one processor, to cause the first radio device to perform:

scanning for advertising messages from radio devices within a scanning range of a connectionless mode of the second radio device using a connectionless mode of the second radio device;

during the scanning, receiving an advertising message from a first radio device at a first reception time instance measured by the second radio device;

transmitting, to the first radio device, a scan request requesting transmission of a scan response using the connectionless mode;

receiving, from the first radio device, the scan response at a third reception time instance measured by the second radio device using the connectionless mode; and performing an auxiliary activity involving wireless communication between the first and second radio devices, wherein the performing of the auxiliary activity is initiated at a second starting time defined to occur at a pre-defined time interval following an anchor point corresponding to the first reception time instance, to a subsequent timestamp generated in response to the receiving of the advertising message at the first reception time instance, to the third reception time instance or to a subsequent timestamp generated in response to the receiving of the scan response at the third reception time instance.

According to an example of the second aspect, the at least one memory and the computer program code are configured to, with the at least one processor, cause the second radio device are further to perform:

maintaining, in a memory of the at least one memory, information comprising one or more of at least one expected measurement latency of at least one reception time measurement defining the anchor point of the first radio device and/or defining an anchor point of the second radio device for timing start of the auxiliary activity, at least one expected measurement uncertainty of at least one reception time measurement defining the anchor point of the first radio device and/or defining the anchor point of the second radio device for timing start of the auxiliary activity, at least one time interval between the anchor point of the first radio device and a first starting time of the auxiliary activity for the first radio device and/or between the anchor point of the second radio device and the second starting time of the auxiliary activity for the second radio device and/or a second transmission time instance measured by the second radio device and corresponding to the transmission of the scan request; and adjusting, before the initiating of the auxiliary activity, the second starting time of the auxiliary activity and/or a tolerance of the second starting time of the auxiliary activity based on said information for ensuring synchronized operation.

According to an example of the second aspect, the at least one memory and the computer program code are configured to, with the at least one processor, cause the second radio device to perform the auxiliary activity by at least:

receiving one or more first auxiliary messages from the first radio device; and/or transmitting one or more second auxiliary messages to the first radio device.

According to an example of the second aspect, the at least one memory and the computer program code are configured to, with the at least one processor, cause the second radio device further to perform:

generating, in response to the receiving of the advertising message, a first advertising report, wherein the first reception time instance is measured by the second radio device by recording a timestamp of the first advertising report; and generating, in response to the receiving of the scan response, a second advertising report, wherein the third reception time instance is measured by the second radio device by recording a timestamp of the second advertising report.

According to an example of the second aspect, the advertising message and/or the scan response comprises an identifier of the first radio device and the scan request comprises an identifier of the second radio device.

According to an example of the second aspect, the advertising message and/or the scan response comprises an identifier of the first radio device and the scan request comprises an identifier of the second radio device and the at least one memory and the computer program code are configured to, with the at least one processor, cause the second radio device further, in response to the receiving of the advertising message, to perform:

generating a common identifier for a pair formed by the first and second radio devices based at least on the identifiers of the first and second radio devices; and performing at least one of the following actions:

transmitting one or more second auxiliary messages to the first radio device as a part of the auxiliary activity, wherein the one or more second auxiliary messages comprise the common identifier; and receiving one or more first auxiliary messages comprising the common identifier from the first radio device as a part of the auxiliary activity and verifying the one or more first auxiliary messages based on the generated common identifier.

According to an example of the second aspect, the advertising message and/or the scan response comprises an identifier of the first radio device and the scan request comprises an identifier of the second radio device and the at least one memory and the computer program code are configured to, with the at least one processor, cause the second radio device further to perform:

generating, in response to the receiving of the scan request, a common identifier for a pair formed by the first and second radio devices based at least on the identifiers of the first and second radio devices; and selecting one or more transmission characteristics of the second radio device for performing the auxiliary activity based on the common identifier.

According to an example of the second aspect, the first and second radio devices are devices supporting a first wireless communication protocol and the advertising message, the scan request, the scan response and any auxiliary messages involved in the auxiliary activity correspond to advertising protocol data units of said first wireless communication protocol, the auxiliary activity being auxiliary to primary operation of the first wireless communication protocol.

According to an example of the second aspect, the first and second radio devices are devices supporting a first wireless communication protocol and the advertising message, the scan request, the scan response and any auxiliary messages involved in the auxiliary activity correspond to advertising protocol data units of said first wireless communication protocol, the auxiliary activity being auxiliary to primary operation of the first wireless communication protocol, the first wireless communication protocol being Bluetooth Low Energy protocol.

According to a third aspect, there is provided a method comprising:

transmitting, using a connectionless mode of a first radio device, an advertising message;

receiving, from a second radio device at a second reception time instance measured by the first radio device using the connectionless mode, a scan request requesting transmission of a scan response, wherein the second radio device is a device which received the advertising message;

transmitting, to the second radio device, the scan response using the connectionless mode; and performing an auxiliary activity involving wireless communication between the first and second radio devices, wherein the performing of the auxiliary activity is initiated at a first starting time defined to occur at a pre-defined time interval following an anchor point corresponding to the second reception time instance or to a subsequent timestamp generated in response to the receiving of the scan request at the second reception time instance.

According to a fourth aspect, there is provided a method comprising:

scanning for advertising messages from radio devices within a scanning range of a connectionless mode of a second radio device using a connectionless mode of the second radio device;

during the scanning, receiving an advertising message from a first radio device at a first reception time instance measured by the second radio device;

transmitting, to the first radio device, a scan request requesting transmission of a scan response using the connectionless mode;

receiving, from the first radio device, the scan response at a third reception time instance measured by the second radio device using the connectionless mode; and performing an auxiliary activity involving wireless communication between the first and second radio devices, wherein the performing of the auxiliary activity is initiated at a second starting time defined to occur at a pre-defined time interval following an anchor point corresponding to the first reception time instance, to a subsequent timestamp generated in response to the receiving of the advertising message at the first reception time instance, to the third reception time instance or to a subsequent timestamp generated in response to the receiving of the scan response at the third reception time instance.

According to a fifth aspect, there is provided a computer program comprising instructions for causing an apparatus to perform at least the following:

transmitting, using a connectionless mode of a first radio device, an advertising message;

receiving, from a second radio device at a second reception time instance measured by the first radio device using the connectionless mode, a scan request requesting transmission of a scan response, wherein the second radio device is a device which received the advertising message;

transmitting, to the second radio device, the scan response using the connectionless mode; and performing an auxiliary activity involving wireless communication between the first and second radio devices, wherein the performing of the auxiliary activity is initiated at a first starting time defined to occur at a pre-defined time interval following an anchor point corresponding to the second reception time instance or to a subsequent timestamp generated in response to the receiving of the scan request at the second reception time instance.

According to a sixth aspect, there is provided a computer program comprising instructions for causing an apparatus to perform at least the following:

scanning for advertising messages from radio devices within a scanning range of a connectionless mode of a second radio device using a connectionless mode of the second radio device;

during the scanning, receiving an advertising message from a first radio device at a first reception time instance measured by the second radio device;

transmitting, to the first radio device, a scan request requesting transmission of a scan response using the connectionless mode;

receiving, from the first radio device, the scan response at a third reception time instance measured by the second radio device using the connectionless mode; and performing an auxiliary activity involving wireless communication between the first and second radio devices, wherein the performing of the auxiliary activity is initiated at a second starting time defined to occur at a pre-defined time interval following an anchor point corresponding to the first reception time instance, to a subsequent timestamp generated in response to the receiving of the advertising message at the first reception time instance, to the third reception time instance or to a subsequent timestamp generated in response to the receiving of the scan response at the third reception time instance.

One or more examples of implementations are set forth in more detail in the accompanying drawings and the description below. Other features will be apparent from the description and drawings, and from the claims.

BRIEF DESCRIPTION OF THE DRAWINGS

In the following the invention will be described in greater detail by means of preferred embodiments with reference to the accompanying drawings, in which.

DETAILED DESCRIPTION OF EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Figure 1:
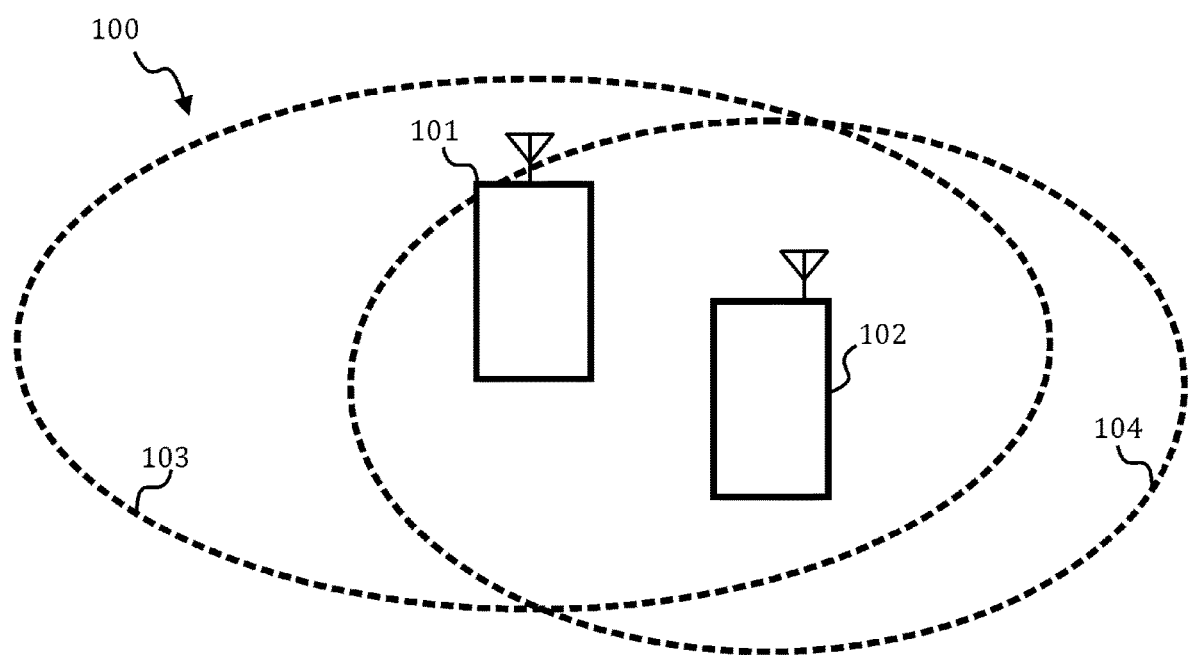
FIG. 1 illustrates a system to which some embodiments may be applied.

FIG. 1 illustrates a system 100 according to embodiments. The system 100 comprises a first radio device 101 and a second radio device 102.

The first and second radio devices 101, 102 may be any radio devices comprising a radio transceiver. Each of the first and second radio devices 101, 102 may be, for example, a portable radio device such as a cellular phone (or a smart phone), a tablet computer or a laptop computer or a wearable radio device such as a smart watch, an earpiece, earphones or smart glasses. In some embodiments, at least one of the first and second radio devices 101, 102 may be a non-portable radio device such as a (desktop) computer or a server computer. The first and second radio devices 101, 102 may be equally called, at least in some embodiments, terminal devices or user equipment.

The first and second radio devices 101, 102 may support at least one first (wireless) radio communication protocol enabling transmitting of advertising messages and scanning for advertising messages transmitted by other radio devices. Said at least one first radio communication protocol may define at least one connectionless mode (equally called connectionless communication mode) for the first and second radio devices 101, 102. Connectionless communication is a data transmission method used in packet switching networks in which each data unit is individually addressed and routed based on information carried in each unit, rather than in the setup information of a prearranged, fixed data channel as in connected communication.

Advertising messages (or advertising protocol data units, PDUs) are commonly used, by radio devices operating in a connectionless mode, to advertise the presence and features of a radio device. Specifically, the advertising message may be transmitted as broadcast messages. Conversely, radio devices operating in a connectionless mode may perform scanning of advertising messages for discovering other radio devices within a scanning or listening range. The scanning or listening range is illustrated in FIG. 1 for the first and second radio devices 101, 102 with the respective elements 103, 104 (not in scale relative to the first and second radio devices 101, 102). As illustrated in FIG. 1, the first and second radio device 101, 102 may be assumed to be within each other's scanning ranges 103, 104 meaning that connectionless communication between the first and second radio device 101, 102 is enabled in both directions. The results of the scanning (i.e., measured signals) may be used, e.g., for selecting a suitable radio device for communication.

Such connectionless communication provides the benefit that no wireless connection or link needs to be established between the first and second radio devices 101, 102 before data transmission which expedites the transfer of data.

Said at least one first radio communication protocol for connectionless signalling may comprise, for example, Bluetooth Low Energy protocol, IEEE 802.11 based protocol and/or IEEE 802.15.4 based protocol. Correspondingly, the advertising message (or advertising protocol data unit, PDU) may comprise, for example, a Bluetooth low energy advertising frame, a WiFi beacon frame, or a broadcast message of a wireless mesh network (such as a beacon frame of a ZigBee network according to IEEE 802.15.4). As an example, a Bluetooth Low Energy advertising frame may comprise one or more of the following data fields: service universally unique identifier (UUID), local name, service data, manufacturer specific data, flags, TX (transmission) power level, slave connection interval range, service solicitation, service data, appearance, public target address, random target address, advertising interval, uniform resource identifier and/or Low Energy supported features. The connectionless mode of said at least one first radio communication protocol for connectionless signalling may support a plurality of radio frequencies. For example, Bluetooth Low Energy defines three frequencies for transmitting and receiving advertising PDUs (i.e., three advertising channels): 2402 MHz, 2426 MHz and 2480 MHz.

Specifically, the advertising messages as discussed in connection with embodiments may be scannable and optionally also connectable. A scannable advertising message indicates that an advertiser (i.e., here, one of the first and second radio device 101, 102) is capable of handling a scan request from an observer (i.e. here, the other one of the first and second radio devices 101, 102). Scan requests and responses are used for allowing devices to advertise more data than can fit into a single advertising message (PDU or packet). A connectable advertising message indicates that the advertiser allows a connection to be established. For example in Bluetooth Low Energy, a Connectable Scannable Undirected advertising message is denoted as ADV_IND while a Scannable Undirected advertising message is denoted as ADV_SCAN_IND. It should be appreciated that, in some other communication protocols, scan request and/or response may have different names while still providing the same functionality.

In addition to the advertising messages, the connectionless mode may enable transmitting one or more scanning message (or scanning PDUs). Scanning messages are messages which enable devices, following the initial transmission and scanning of advertising message, to broadcast more advertising data than is allowed in a single advertising PDU. Said scanning message may comprise a scan request (transmitted by the observer or scanner which received an advertising message) and scan response (transmitted by the advertiser in response to the reception of a scan request). For example in Bluetooth Low Energy, a Scan Request is denoted as SCAN_REQ while a Scan Response denoted as SCAN_RSP.

Additionally, said at least one first radio communication protocol may define at least one connected mode (equally called connected communication mode) for the first and second radio devices 101, 102. The first and second radio device 101, 102 may also support at least one second radio communication protocol defining at least one connected mode for the first and second radio devices 101, 102 (but no connectionless mode).

Embodiments to be discussed below introduce a concept where two devices can synchronize a common auxiliary activity using a three-way handshake. One of the benefits of the solution is that it may be integrated into an existing protocol which enables wireless communication between two devices but does not support explicit synchronization mechanisms (e.g., Bluetooth Low Energy protocol). Moreover, the embodiments provide a method which makes it possible for the transmitting radio device in said auxiliary activity to transmit packets to the peer that was identified in the first part of the invention in a synchronized manner. Furthermore, embodiments enable efficient scheduling of said auxiliary activity such that the synchronizing mechanism can continue to look for new synchronization exchanges even after a certain first auxiliary activity was agreed. The functionalities according to embodiments may be specifically implemented on top of existing protocols without "breaking" the specification of said existing protocol. In other words, the solutions according to embodiments allow devices which support the existing protocol to identify each other and interact with each other orthogonally to the underlaying protocol. Correspondingly, "auxiliary activity" may be defined, here and in the following, specifically as an activity which is auxiliary relative to (primary) operation or functioning of the existing wireless communication protocol (e.g., Bluetooth Low Energy) on top of which the new functionalities are built.

Figure 2:
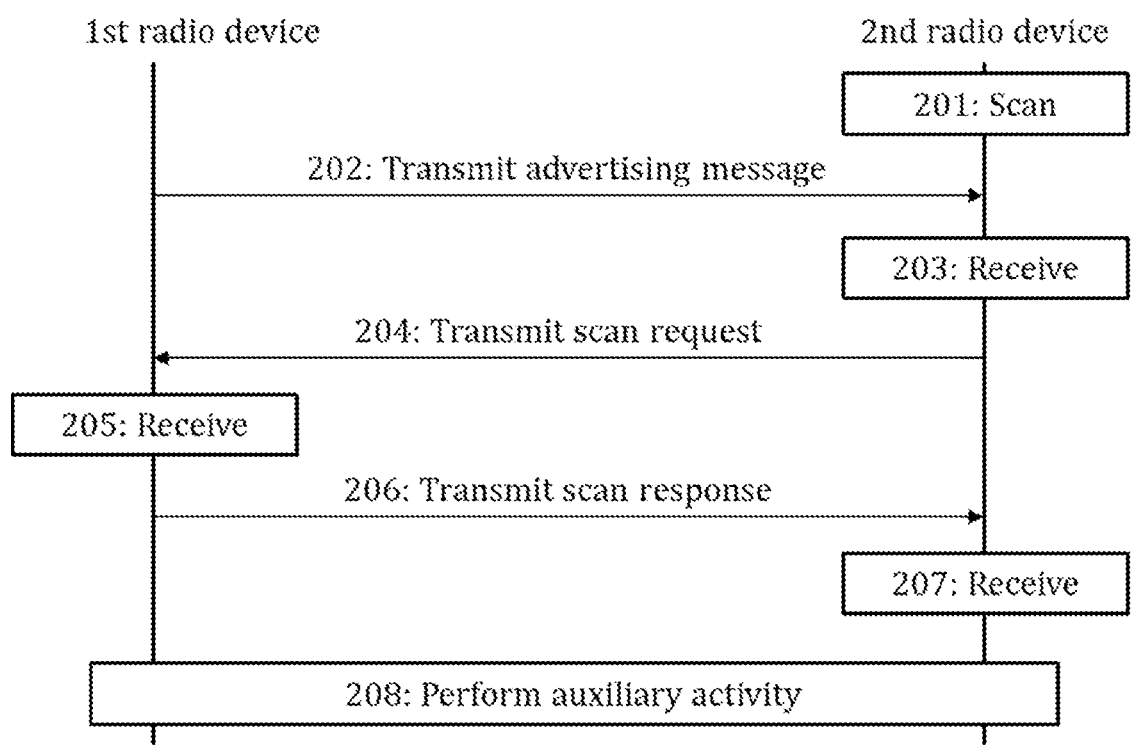
FIGS. 2, 3, 4A and 4B illustrate procedures according to embodiments.

FIG. 2 illustrates processes according to embodiments for performing synchronization between two radio devices for performing an auxiliary activity and performing said auxiliary activity. Specifically, FIG. 2 illustrates functionalities of a first radio device (acting here as an "advertiser"), a second radio device (acting here as a "scanner") and signalling between them. The first radio device and/or the second radio device of FIG. 2 may correspond to the first radio device 101 and/or the second radio device 102 of FIG. 1, respectively. In some embodiments, the functionalities of the first radio device and the second radio device may be carried out by a certain subunit of the first radio device and the second radio device, respectively. All of the actions described in connection with FIG. 2 may, at least in some embodiments, be carried out using the same wireless communication protocol supporting advertising (e.g., Bluetooth Low Energy protocol).

The procedure is initiated by the second radio device scanning, in block 201, for advertising messages from radio devices within a scanning range of a connectionless mode of the second radio device. The connectionless mode (or connectionless communication mode) and associated advertising messages may be defined as described in relation to FIG. 1. For example, the connectionless mode and the advertising messages may correspond to the ones defined in the Bluetooth Low Energy protocol. The second radio device (and/or the first radio device) may be configured to perform scanning periodically. The scanning may be carried at a single advertising radio frequency or at a plurality of advertising radio frequencies.

During the scanning in block 201, the first radio device transmits, in message 202, an advertising message (or an advertising PDU or packet) to the second radio device. Transmission of the advertising message (message 202) may be performed using a connectionless mode of the first radio device. The transmission may occur at a first transmission time instance as measured by the first radio device (using its local reference clock). The transmission may correspond specifically to broadcast transmission (or undirected transmission). The advertising message may be a (connectable) scannable undirected advertising message. In some embodiments, said plurality of first advertising messages may be transmitted also to one or more other radio devices (not shown in FIG. 2). In some embodiments, the first radio device may be configured to transmit advertising messages (such as the one in message 202) periodically. The advertising messages may comprise at least discovery and/or connection establishment information on the first radio device. Specifically, the advertising message may comprise at least an identifier of the first radio device. Said identifier of the first radio device may correspond to a device address of the first radio device.

The second radio device receives, in block 203, the advertising messages transmitted by the first radio device during said scanning at a first reception time instance $t'_1$ as measured by the second radio device (using its local reference clock). The measured first reception time instance $t'_1$ may be associated with a first measurement latency ($l_1$) and a first measurement uncertainty or jitter ($j_1$). Jitter may, in general, be defined as deviation from true periodicity of a presumably periodic signal. Here, measurement uncertainty or jitter is specifically associated with change or variation of latency during transmission (causing said deviation from true periodicity). The measurement uncertainty or jitter may be defined as a confidence interval associated with a certain confidence level (e.g., 95%) or as other corresponding range of plausible time values around the measured value. The latency may correspond, here and in the following, to latency between the actual end of a PDU and the time instance when the associated reception time instance is measured. In other words, the measured first reception time instance $t'_1$ differs from the first transmission time instance by $l_1 \pm j_1$.

The first radio device and/or the second radio device may be assumed to maintain, in the respective memory of the first and/or second radio device, information on average or expected first measurement latency ($l_1$) and average and/or expected first measurement uncertainty or jitter ($j_1$) associated with the reception of advertising messages by the second terminal device (from the first radio device).

The first reception time instance (or equally a first reception timestamp) $t'_1$ constitutes a possible anchor point for an auxiliary activity, as will be discussed below in detail. The second radio device may store the measured first reception time instance $t'_1$ (i.e., a timestamp of the reception of the advertising message) and/or the identifier of the first radio device and/or any other information comprised in the advertising message to a memory of the second radio device.

It should be noted that measurement latency and measurement jitter, here and in the following, are application dependent. Namely, the measurement latency and measurement jitter may depend, e.g., on how often a particular application polls for new radio events or, in general, on the delay between the actual reception time and an assumed reception time $t'$ (e.g., $t'_1$ mentioned above) measured by the (first/second) radio device. Preferably, the measurement uncertainty and variation in the latency should be as small as possible to enable more energy efficient performance.

In response to the receiving in block 203, the second radio device transmits, in message 204, a scan request (or simply a request) for requesting a transmission of a scan response to the first radio device. The scan request may comprise at least an identifier of the second radio device. Said identifier of the second radio device may correspond to a device address of the second radio device. The scan request may further comprise the identifier of the first radio device for indicating the intended recipient of the scan request. Transmission of the scan request (message 204) may be performed using a connectionless mode of the second radio device. The scan request in message 204 may be transmitted using the same (carrier) frequency (i.e., the same advertising channel) as used by the associated advertising message.

The first radio device receives, in block 205, the scan request from the second radio device at a second reception time instance $t'_2$ measured by the first radio device (according to its local reference clock). The measured second reception time instance $t'_2$ is associated with a second measurement latency ($l_2$) and a second measurement uncertainty or jitter ($j_2$). In other words, the measured second reception time instance $t'_2$ differs from the second transmission time instance by $l_2 \pm j_2$. The second (average) measurement latency $l_2$ may correspond (substantially) to the first (average) measurement latency $l_1$.

The first radio device and/or the second radio device may be assumed to maintain, in the respective memory of the first and/or second radio device, information on the second (average or expected) measurement latency ($l_2$) and/or the second (average or expected) measurement uncertainty or jitter ($j_2$) associated with the reception of scan requests by the first terminal device (from the second radio device).

The second reception time instance (or equally a second reception timestamp) $t'_2$ constitutes a possible anchor point for an auxiliary activity, as will be discussed below in detail. The first radio device may store the measured second reception time instance $t'_2$ (i.e., a timestamp of the reception of the scan request) and/or the identifier of the second radio device and/or any other information comprised in the scan request to a memory of the first radio device.

The first radio device transmits, in message 206, to the second radio device, a scan response at a third transmission time instance (as measured by the first radio device). The scan response may comprise the identifier of the first radio device. In some embodiments, the scan response may also comprise the identifier of the second radio device (i.e., the target). The scan response in message 206 may be transmitted using the same (carrier) frequency (i.e., the same advertising channel) as used by the advertising message and the scan request.

In some embodiments, the transmission of the scan response, in message 206, by the first radio device, may be performed only in response to detecting, by the first radio device, that the scan request comprises the identifier of the first radio device.

In some embodiments, the scan response (message 206) may comprise additional advertising payload like suggested by the Bluetooth (Low Energy) specification and/or vendor specific data. Said vendor specific data may convey, e.g., the identifier (e.g., the device address) of the second radio device (i.e., the scanner) and/or additional data that might be useful for the scheduling of the auxiliary activity.

The scan response may comprise information on an auxiliary activity to be performed between the first and second radio devices. Said information on the auxiliary activity may comprise, for example, information on a general definition of the auxiliary activity (e.g., which information should be transmitted to the first radio device, which information is expected to be received from the first radio device and/or which (advertising) PDU type should be employed for transmission and/or is expected to be received) and/or timing of the auxiliary activity (or specifically of one or more transmissions or receptions associated with the auxiliary activity) relative to one or more anchor points. Alternatively or additionally, said information on the auxiliary activity may comprise one or more configuration parameters needed for the auxiliary activity to be performed (e.g., starting time, one or more frequencies to use and/or duration). Alternatively or additionally, said information on the auxiliary activity may comprise any protocol-conformant data. To an observer who does not know about the auxiliary activity, such information might look like regular (Bluetooth) traffic.

In some more general embodiments, said information on the auxiliary activity may be comprised in the advertising message and/or the scan response. In other words, one of the advertising message and the scan response may comprise said information on the auxiliary activity or said information on the auxiliary activity may be comprised partly in the advertising message and partly in the scan response.

Alternatively or additionally, at least some or all of said information on the auxiliary activity may be assumed to be pre-stored, fully or partly, to the memory of the second radio device. In other words, in some embodiments, no information relating to the auxiliary activity (apart from possibly the timing information) is communicated in the scan response. Transmission of the scan response (message 206) may be performed using the connectionless mode of the first radio device.

The second radio device receives, in block 207, the scan response from the first radio device at a third reception time instance $t'_3$ measured by the second radio device (according to its local reference clock). The measured third reception time instance $t'_3$ may be associated with a third measurement latency ($l_3$) and a third measurement uncertainty or jitter ($j_3$). The second (average) measurement latency $l_3$ may correspond (substantially) to the first (average) measurement latency $l_1$ and/or the second (average) measurement latency $l_2$. The second radio device may store the measured third reception time instance $t'_3$ (i.e., a timestamp of the reception of the scan response) and/or any other information comprised in the scan response to a memory of the second radio device.

The first radio device and/or the second radio device may be assumed to maintain, in the respective memory of the first and/or second radio device, information on average or expected third measurement latency ($l_3$) and/or average or expected third measurement uncertainty or jitter ($j_3$) associated with the reception of scan responses by the second terminal device (from the first radio device).

While the three-way handshake procedure was discussed above for a single advertising message, it should be appreciated that, in other embodiment, a plurality of advertising messages may be transmitted. Said plurality of advertising messages may correspond to different advertising frequencies (or advertising channels). A separate scan request and subsequently a separate scan response may be transmitted for each of said plurality of advertising messages (at the advertising frequency or channel of the associated advertising message).

At this point, both the first and second radio devices have enough information to determine the identity of the other radio device (i.e., the identity of the peer) and the starting time of the auxiliary activity. Thus, the first and second radio devices perform, in block 208, the auxiliary activity. The auxiliary activity is defined to involve wireless communication between the first and second radio devices. Specifically, the auxiliary activity may comprise transmitting one or more first auxiliary messages (or PDUs or packets) from the first radio device to the second radio device and/or transmitting one or more second auxiliary messages from the second radio device to the first radio device. Correspondingly, the auxiliary activity may comprise also receiving one or more first auxiliary messages in the second radio device from the first radio device and/or receiving one or more first auxiliary messages in the first radio device from the second radio device. Either of the first and second radio devices may transmit the initial auxiliary message. Each of said one or more first or second auxiliary messages may comprise the identifier of the first and/or second radio device for indicating the intended recipient (i.e., the first or second radio device) of the auxiliary signal and/or the source (i.e., the second or first radio device) of the auxiliary signal. Alternatively, each of said one or more first or second auxiliary messages may comprise a common identifier generated at least based on the identifiers of the first and second radio devices (see discussion on FIG. 4A for further details). The auxiliary activity may be carried out using connectionless modes of the first and second radio device and/or using connected modes of the first and second radio devices.

The auxiliary activity (i.e., transmission and/or reception of one or more auxiliary messages) may be initiated and carried out, by the first and second radio devices, in synchronization with each other. Said synchronization is enabled by the three-way handshake procedure discussed in relation to elements 201 to 207.

Specifically, the performing of the auxiliary activity in block 208, by the first radio device, may be initiated at a first starting time defined to occur at a first (pre-defined) time interval (having a value $d_2$) from a first anchor point corresponding to the second reception time instance $t'_2$ measured by the first radio device. On the other hand, the performing of the auxiliary activity in block 208, by the second radio device, may be initiated at a second starting time defined to occur at a second (pre-defined) time interval (having a value $d_1$ or $d_3$) from a second anchor point corresponding to the first or third reception time instance $t'_1$ or $t'_3$ measured by the second radio device. The first and second starting times may be configured to coincide (though, in practice, some offset between the first and second starting times may exist, as will be discussed below). The initiation of the auxiliary activity by the first or second radio device may correspond here to, e.g., initiation of transmission or reception (or scanning for reception) of an auxiliary message.

In other embodiments, other hardware or software events or signals (or specifically associated timestamps) that the second radio device generates in response to receiving the advertising message or to receiving the scan response may be used as a possible second anchor point for the auxiliary activity for the second radio device. Additionally or alternatively, other hardware or software events or signals (or specifically associated timestamps) that the first radio device generates in response to receiving the scan request may be used as a possible first anchor point for the auxiliary activity for the first radio device.

As mentioned above, the first and second starting times defined for the first and second radio devices coincide, at least substantially. Namely, the first and second starting times defined based on measured reception time instances have certain uncertainty associated with them causing them to potentially slightly misalign with each other in time. The first radio device and/or the second radio device may maintain information which may be used for adjusting the starting time of the auxiliary activity to take into account said misalignment.

Specifically, in some embodiments, the first radio device may maintain, in the memory of the first radio device, information comprising one or more of 1) at least one expected or average measurement latency of at least one reception time measurement defining the anchor point of the first radio device and/or defining an anchor point of the second radio device for timing start of the auxiliary activity (e.g., any of $l_1$, $l_2$ and $l_3$ mentioned above, preferably at least $l_1$ or $l_3$ relating to the second radio device),
2) at least one expected or average measurement uncertainty of at least one reception time measurement defining an anchor point of the first radio device and/or defining the anchor point of the second radio device for timing start of the auxiliary activity (e.g., any of $j_1$, $j_2$ and $j_3$ mentioned above, preferably at least $j_1$ or $j_3$ relating to the second radio device),
3) at least one time interval between an anchor point of the first radio device and the first starting time of the auxiliary activity for the first radio device and/or between the anchor point of the second radio and the second starting time of the auxiliary activity for the second radio device (e.g., any of $d_1$, $d_2$ and $d_3$ mentioned above),
4) a first transmission time instance ($t_1$) measured by the first radio device and corresponding to the transmission of the advertising message and/or
5) a third transmission time instance ($t_3$) measured by the first radio device and corresponding to the transmission of the scan response.

In other words, said information may comprise all of items 1)-5) or a subset of said items 1)-5) (e.g., only items 1)-4)). In items 1)-3), the at least one reception time measurement may correspond, for the first radio device, to the measurement of the second reception time instance ($t'_2$) and/or, for the second radio device, to the measurement of first and/or third reception time instance ($t'_1/t'_3$), as discussed above. The information pertaining to items 1)-3) may be maintained in the memory even before the execution of the process of FIG. 2.

Based on the information listed above, the first radio device may adjust, before the initiating of the auxiliary activity, the first starting time of the auxiliary activity and/or a tolerance of the first starting time for ensuring synchronized operation (i.e., ensuring that transmission of the first radio device is not missed by the second radio device or that the first radio device does not miss a transmission from the second radio device). The tolerance may correspond, here and in the following, e.g., to the duration of a transmission or reception period or interval associated with the first starting time. The adjusting may comprise calculating an expected second starting time of the auxiliary activity for the second radio device and its uncertainty and basing the adjustment at least thereon (and on the first starting time of the auxiliary activity for the first radio device and optionally also its uncertainty). For example, the first radio device may calculate the expected second starting time and the associated uncertainty based on $t_1$, $l_1$, $j_1$, and $d_1$ or on $t_3$, $l_3$, $j_3$, and $d_3$ (depending on which anchor point is used by the second radio device). Thus, at least $l_1$, $j_1$, and $d_1$ or $l_3$, $j_3$, and $d_3$ may be initially maintained in the memory of the second terminal device.

For example, the first starting time may be calculated, by the first radio device, directly based on the time measurement of the scan request according to $t_{st,1}=t'_2+d_2$ while the expected second starting time may be calculated, by the first radio device, as $t_{st,2}=t_1+l_1+d_1$ or $t_{st,2}=t_3+l_3+d_3$ (depending on which anchor point is used by the second radio device). Taking into account the measurement uncertainty or jitter, the actual second starting time is expected to have, respectively, a value in the range $t_{st,2}\pm j_1$ or $t_{st,2}\pm j_3$ (depending on which anchor point is used by the second radio device). If the first radio device is starting the auxiliary activity by transmitting an auxiliary message, i.e., if the first starting time of the auxiliary activity corresponds to a transmission time instance, said transmission time instance or transmission time interval around said transmission time instance may be adjusted, by the first radio device, so that the second radio device is able to receive the auxiliary message (at least with a certain pre-defined level of probability). Correspondingly, if the first radio device is starting the auxiliary activity by receiving an auxiliary message, i.e., if the first starting time of the auxiliary activity corresponds to a reception time instance, the reception time instance and/or listening time interval around the reception time instance may be adjusted to ensure that an auxiliary message is received from the second radio device (at least with a certain pre-defined level of probability).

Additionally or alternatively, in some embodiments, the second radio device may maintain, in the memory of the second radio device, information comprising any of items 1)-3) listed above for the first radio device and/or a second transmission time instance ($t_2$) measured by the second radio device and corresponding to the transmission of the scan request. Based on this information, the second radio device may adjust, before the initiating of the auxiliary activity, the second starting time of the auxiliary activity and/or a tolerance of the second starting time for ensuring synchronized operation. The adjusting may comprise calculating an expected first starting time of the auxiliary activity for the first radio device and its uncertainty and basing the adjustment at least thereon (and on the second starting time of the auxiliary activity for the second radio device and optionally also its uncertainty). For example, the second radio device may calculate the expected first starting time and the associated uncertainty based on $t_2$, $l_2$, $j_2$, and $d_2$. Thus, at least $l_2$, $j_2$, and $d_2$ may be initially maintained in the memory of the second terminal device.

For example, the second starting time may be calculated, by the second radio device, directly based on the time measurement of the advertisement message or scan response according to $t_{st,2}=t'_1+d_1$ or $t_{st,2}=t'_3+d_3$ while the expected first starting time may be calculated, by the second radio device, as $t_{st,1}=t_2+l_2+d_2$. Taking into account the measurement uncertainty or jitter, the actual first starting time is expected to have a value in the range $t_{st,1}\pm j_2$. Based on this information, the adjustment of the second starting time and associated time transmission/reception time interval may be performed, mutatis mutandis, as discussed for the first radio device.

In some embodiments, information on the uncertainty pertaining to the local reference clocks of the first and/or second radio devices may also be maintained in the memory of the first and/or second radio device and be taken into account in adjusting the first and/or second starting times of the auxiliary activity for the first and/or second radio devices.

It should be noted that, following the reception of the scan response in block 207 (i.e., following the termination of the three-way handshake procedure), the first and/or second radio devices may still continue look for new synchronization exchanges even after the auxiliary activity was agreed upon. This may entail periodic or regular scanning, by the first and/or second radio devices, for advertisement messages.

In some embodiments, the first and second radio devices are devices supporting a first wireless communication protocol and the advertising message, the scan request and the scan response (and possibly at least one auxiliary messages involved in the auxiliary activity) correspond to advertising protocol data units of said first wireless communication protocol, the auxiliary activity being auxiliary to primary operation of the first wireless communication protocol. Said first wireless communication protocol may be, e.g., Bluetooth Low Energy protocol, as will be discussed below in detail.

Figure 3:
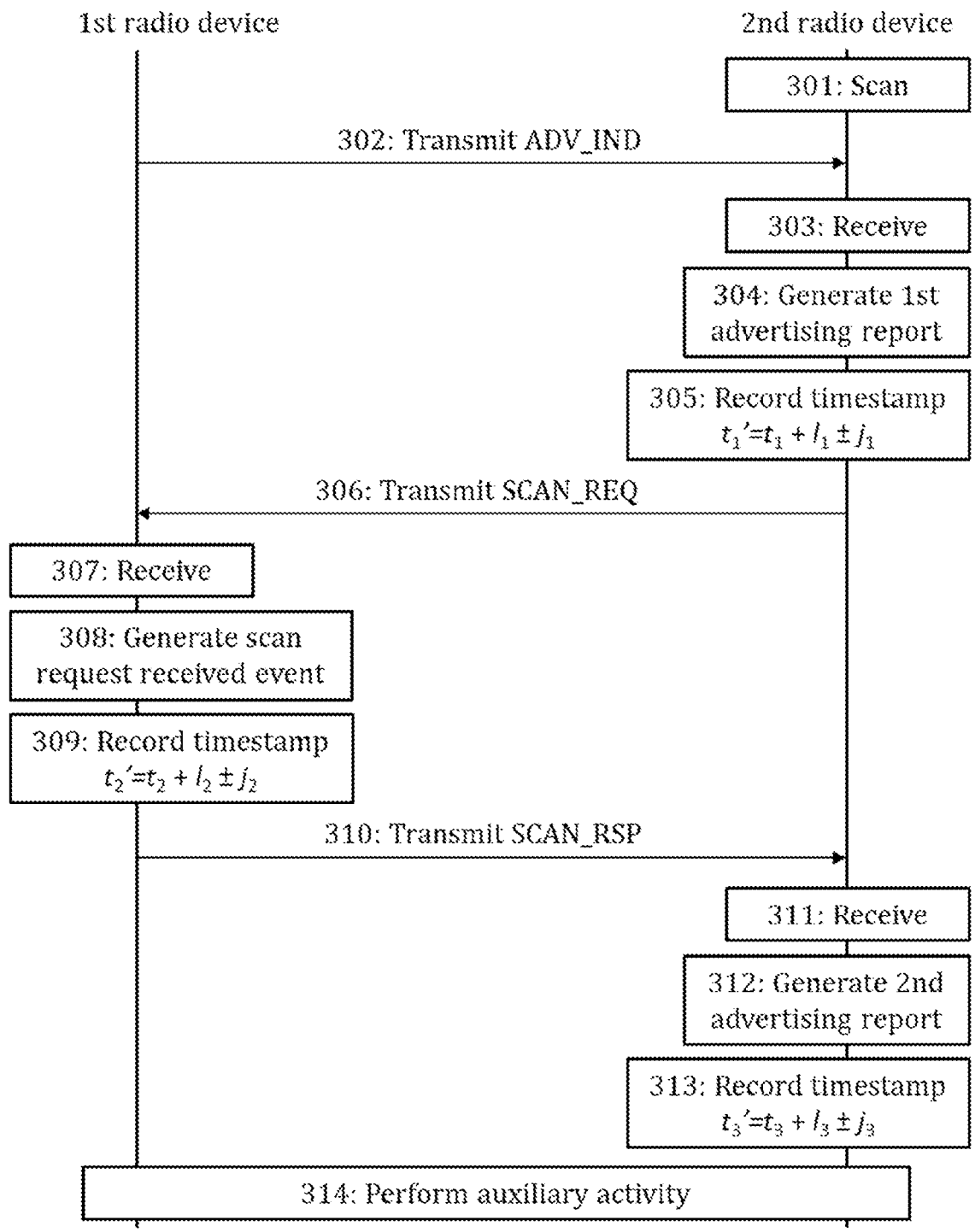

FIG. 3 illustrates in more detail the process according to embodiments. Specifically, the procedure of FIG. 3 may correspond to an implementation of the procedure of FIG. 2 using Bluetooth Low Energy. It should be noted that the solution can be integrated in Bluetooth Low Energy advertising and/or scanning without any changes in the link layer itself. Thus, similar to FIG. 2, FIG. 3 illustrates functionalities of a first radio device, a second radio device and signalling between them. The first radio device and/or the second radio device may correspond to the first radio device 101 and/or the second radio device 102 of FIG. 1, respectively. In some embodiments, the functionalities of the first radio device and the second radio device may be carried out by a certain subunit of the first radio device and the second radio device, respectively.

The procedure illustrated in FIG. 3 corresponds, to a large extent, to the procedure of FIG. 2. Any of the features described in connection with FIG. 2 may apply, mutatis mutandis, to the procedure of FIG. 3.

Referring to FIG. 3, the procedure is initiated, similar to the procedure of FIG. 2, by the second radio device scanning, in block 301, for advertising messages (or PDUs or packets) from radio devices within a scanning range of a connectionless mode of the second radio device. As mentioned above, the connectionless mode and the advertising messages correspond to the ones defined in the Bluetooth Low Energy protocol. The second terminal may, thus, scan in block 301 specifically for Bluetooth Low Energy advertising PDUs. The scanning may be carried at a single radio frequency or a plurality of radio frequencies of the three frequencies reserved for advertising in Bluetooth Low Energy protocol.

During the scanning in block 301, the first radio device transmits, in message 302, an advertising message to the second radio device. The transmission may occur at a first transmission time instance as measured by the first radio device (using its local reference clock). Here, the advertising message is specifically an ADV_IND PDU. The ADV_IND PDU is a PDU used in connectable and scannable undirected advertising events. The payload of ADV_IND PDU comprises of an advertiser address (AdvA) (corresponding here to the identifier of the first radio device) and advertiser data (AdvData) fields having respective sizes of 6 and 0-31 octets. The AdvA field contains the advertiser's (here, the first radio device's) public or random device address as indicated by TxAdd. The AdvData field, if not empty, shall contain Advertising Data from the advertiser's Host. The TxAdd is a field in the advertising physical channel PDU header. The TxAdd indicates whether the advertiser's address in the AdvA field is public (TxAdd=0) or random (TxAdd=1).

The second radio device receives, in block 303, the ADV_IND PDU transmitted by the first radio device during said scanning. In response to the receiving in block 303, the second radio device generates, in block 304, a first advertising report (or a first advertising report event). According to a general definition, the advertising report event indicates that the radio device has responded to an active scan or received some information during a passive scan.

Moreover, the second radio device records (stores to a memory), in block 305, a first timestamp ($t'_1$) of the first advertising report (corresponding to the first reception time instance, as discussed in above embodiments). Similar to as discussed in connection with FIG. 2, the first timestamp may have the following form $t'_1=t_1+l_1\pm j_1$, where $t_1$ is a time of transmission defined to correspond to a certain part of the transmitted PDU, for instance, beginning or end of a PDU, $l_1$ is a first (average) measurement latency and $j_1$ is a first measurement uncertainty or jitter. As described above, $t'_1$ is a potential anchor point for the auxiliary activity.

The second radio device transmits, in message 306, a scan request to the first radio device. The scan request may correspond specifically to a SCAN_REQ PDU. The payload of the SCAN_REQ PDU comprises ScanA and AdvA fields, each having the size of 6 octets. The ScanA field contains the scanner's (here, the second radio device's) public or random device address as indicated by TxAdd. The AdvA field is the address of the device (here, the first radio device) to which this PDU is addressed (as received in message 302). The AdvA field contains the advertiser's (here, the first radio device's) public or random device address as indicated by RxAdd. The TxAdd in the advertising physical channel PDU header indicates whether the scanner's address in the ScanA field is public (TxAdd=0) or random (TxAdd=1). The RxAdd in the advertising physical channel PDU header indicates whether the advertiser's address in the AdvA field is public (RxAdd=0) or random (RxAdd=1).

The first radio device receives, in block 307, the SCAN_REQ PDU from the second radio device. In response to the receiving in block 307, the second radio device generates, in block 308, a scan request received event. According to a general definition, the scan request received event indicates that a SCAN_REQ PDU (or an AUX_SCAN_REQ PDU) has been received by the advertiser. The scan request contains a device address of the scanner (here, the second radio device).

Moreover, the first radio device records (stores to a memory), in block 309, a second timestamp ($t'_2$) of the scan request received event (corresponding to the second reception time instance, as discussed in above embodiments). Similar to as discussed in connection with FIG. 2, the second timestamp may have the following form $t'_2=t_2+l_2\pm j_2$, where $t_2$ is a time of transmission defined to correspond to a certain part of the transmitted PDU (i.e., SCAN_REQ PDU), for instance, beginning or end of the PDU, $l_2$ is a second (average) measurement latency and $j_2$ is a second measurement uncertainty or jitter. As described above, $t'_2$ is a potential anchor point for the auxiliary activity.

The first radio device transmits, in message 310, to the second radio device, a scan response. The scan response may correspond specifically to a SCAN_RSP PDU. The payload of the SCAN_RSP PDU comprises AdvA and ScanRspData fields having respective sizes of 6 and 0-31 octets. The AdvA field contains the advertiser's (here, the first radio device's) public or random device address as indicated by TxAdd. The ScanRspData field may contain any data from the advertiser's Host.

The second radio device receives, in block 311, the SCAN_RSP PDU from the first radio device. In response to the receiving in block 311, the second radio device generates, in block 312, a second advertising report (or second advertising report event).

Moreover, the second radio device records (stores to a memory), in block 313, a third timestamp ($t'_3$) of the second advertising report (corresponding to the third reception time instance, as discussed in above embodiments). Similar to as discussed in connection with FIG. 2, the third timestamp may have the following form $t'_3=t_3+l_3\pm j_3$, where $t_3$ is a time of transmission defined to correspond to a certain part of the transmitted PDU (here, the SCAN_RSP PDU), for instance, beginning or end of a PDU, $l_3$ is a third (average) measurement latency and $j_3$ is a third measurement uncertainty or jitter. As described above, $t'_3$ is a potential anchor point for the auxiliary activity.

Following the three-way handshake procedure described in connection with element 301 to 312, the first and second radio device may carry out the auxiliary activity in block 314 as described above in relation to block 208 of FIG. 2.

Figure 4A:
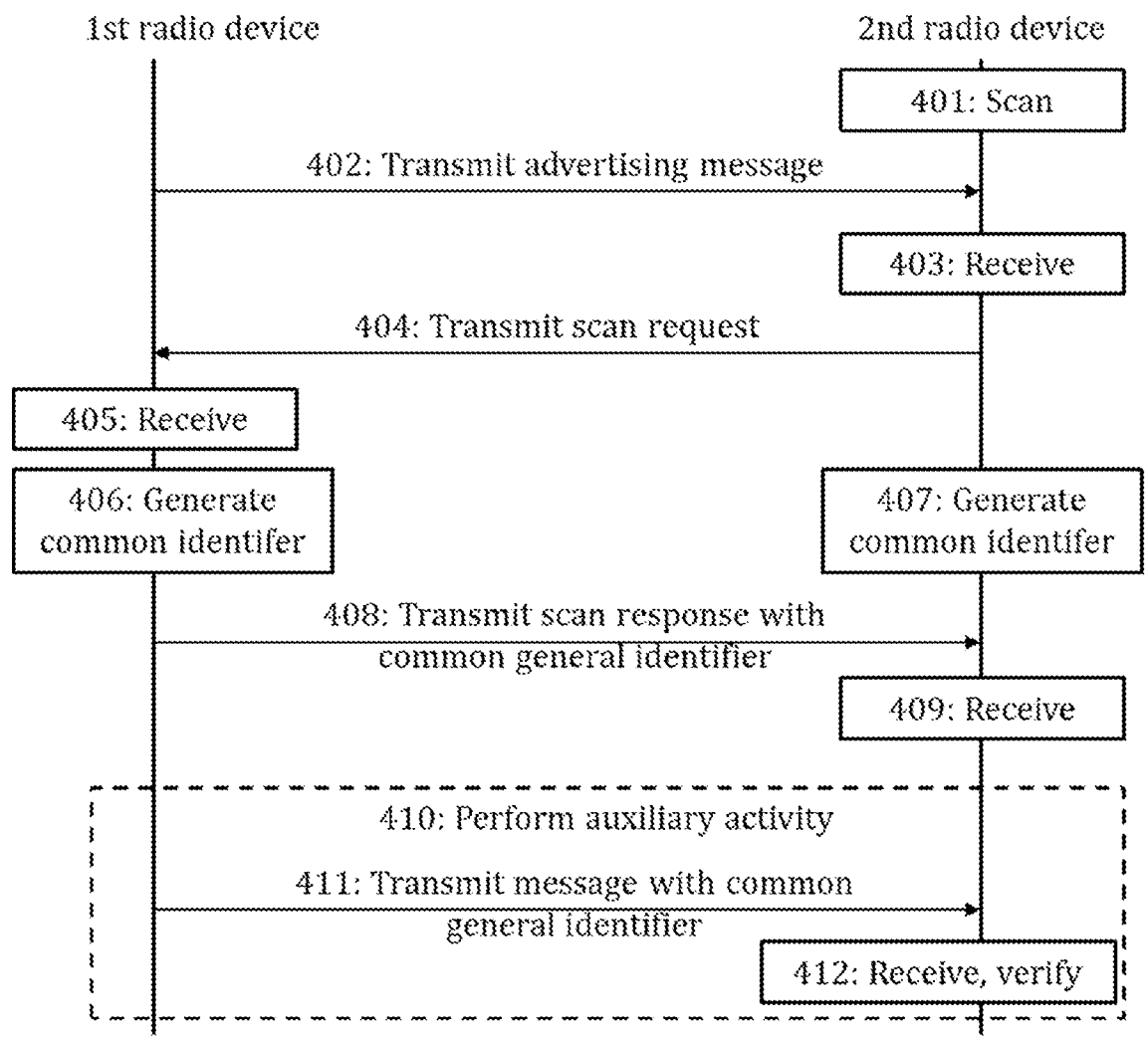
Figure 4B:
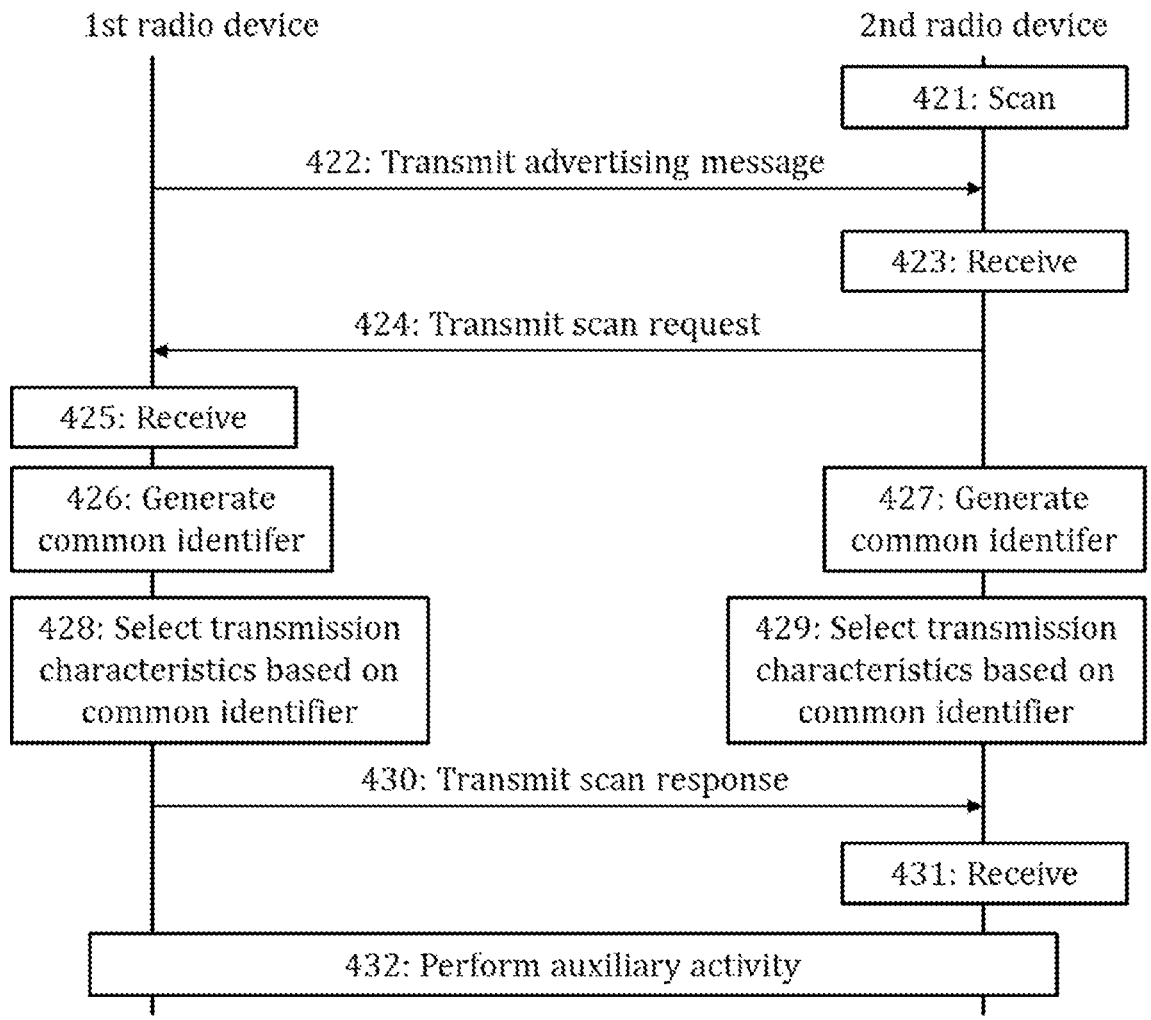

In a scenario where multiple (co-located) second radio devices (i.e., scanners) send scan requests according to above embodiments simultaneously, said second radio devices have no way knowing whether or not they are the chosen peer for the auxiliary activity for a given first radio device (i.e., a given advertiser). FIGS. 4A and 4B illustrate two different alternative processes for overcoming these problems according to embodiments. Similar to FIGS. 2 and 3, FIGS. 4A and 4B illustrate functionalities of a first radio device, a second radio device and signalling between them. The first radio device and/or the second radio device may correspond to the first radio device 101 and/or the second radio device 102 of FIG. 1, respectively. In some embodiments, the functionalities of the first radio device and the second radio device may be carried out by a certain subunit of the first radio device and the second radio device, respectively.

FIGS. 4A and 4B correspond, to a large extent, to the embodiments described in relation to FIGS. 2 and 3. The discussion provided in connection with FIGS. 2 and 3 applies, mutatis mutandis, to the processes of FIGS. 4A and 4B, unless otherwise stated. For example, elements 401 to 405 of FIG. 4A and 421 to 425 of FIG. 4B may correspond to respective elements 201 to 205 of FIG. 2 or to elements 301 to 309 of FIG. 3. In the following, the discussion of FIGS. 4A and 4B is concentrated on the newly introduced features not discussed in connection with FIG. 2 or 3.

Both solutions in FIGS. 4A and 4B are based on the idea of generating a common identifier for the pair formed by the first and radio devices and using it to differentiate between different messages. In FIG. 4A, following the reception of the scan request in block 405, the first radio device generates, in block 406, said common identifier based at least on the identifiers of the first and second radio devices. The common identifier may be generated so that the common identifier is unique for that particular pair of first and second radio devices (i.e., for a particular pair of an advertiser and a scanner). As described above, the identifier of the second radio device (e.g., a device address of the second radio device) may have been received as a part of the scan request (message 404). The first radio device is obviously also aware of its on identifier. The generation of the common identifier in block 406 may be, additionally or alternatively, based on any other information known to both the first and second radio devices. The common identifier may be stored to a memory of the first radio device.

Similarly, the second radio device also generates, in block 407, the same common general identifier based at least on the identifiers of the first and second radio devices (and optionally any other information known to both the first and second radio devices). As described above, the identifier of the first radio device may have been received as a part of the advertising message (message 402). The common identifier may stored to a memory of the second radio device.

In the embodiment of FIG. 4, the common identifier is included, as payload, in the scan response which is transmitted by the first radio device, in message 408, to the second radio device. The second radio device may receive, in block 409, the scan response similar to as described in connection with block 208 of FIG. 2. However, in this case, the second radio device may verify, by comparing the common identifier included in the scan response to the one maintained in the memory of the second radio device, that the scan response is, in fact, intended for the second radio device. The second radio device may, thus, be configured to neglect any received scan responses which are not addressed to it. In other words, only the reception of a scan response including the correct common identifier triggers the performing of the associated auxiliary activity.

Additionally or alternatively, the common identifier may be taken into account in the performing of the auxiliary activity. Namely, at least one auxiliary message transmitted between the first and second radio devices as a part of the auxiliary activity may comprise the common identifier. The same verification procedure may be carried out also in this case upon reception of the at least one auxiliary message. FIG. 4A illustrates specifically a scenario where the performing of the auxiliary activity in block 410 comprises transmitting an auxiliary message comprising the common identifier, in message 411, from the first radio device to the second radio device. The second radio device receives, in block 412, the auxiliary message. Upon reception in block 412, the second radio device may verify, in block 412, the received auxiliary message based on the common identifier included in the auxiliary message and generated by the second radio device (and maintained in its memory). Additionally or alternatively, the performing of the auxiliary activity may comprise transmitting an auxiliary message comprising the common identifier from the second radio device to the first radio device and subsequently verifying the auxiliary message by the first radio device based on the common identifiers included in the auxiliary message and generated by the first radio device.

The process of FIG. 4B also involves generating, in blocks 426, 427, the common identifier for the first and second radio devices by the first and second radio device similar to as described in connection with blocks 406, 407 of FIG. 4A. However, in this embodiment, the common identifier is used for selecting, in blocks 428, 429, one or more transmission characteristics for the auxiliary activity. For example, the first and/or second radio device may maintain, in respective memory of the first and/or second radio device, information on mappings between common identifiers and sets of one or more transmission characteristics and the selecting in blocks 428, 429 may be based on, in addition to the generated common identifier, said mappings. The one or more transmission characteristics may relate to one or more auxiliary messages to be transmitted as a part of the auxiliary activity. The one or more transmission characteristics to be used for the auxiliary activity may comprise, for example, one or more radio frequencies and/or bandwidths, an analog or digital synchronization sequence and/or a modulation method. Preferably, the one or more transmission characteristics selected by the first radio device and the second radio device in blocks 428, 429 are identical. Thereafter, actions relating to elements 430 to 432 may be carried out as discussed in connection with elements 206 to 208 of FIG. 2 though using the selected one or more transmission characteristics.

In some embodiments, the first and/or second radio device may, alternatively or additionally, select, in blocks 406, 407 of FIG. 4, one or more transmission characteristics relating to the scan response such as a parameter relating addition of a trailer to the scan response.

In some other embodiments, the selecting of the one or more transmission characteristics by the first and second radio devices may be carried out after the transmission and reception of the scan response (i.e., after elements 430, 431). While the processes of FIGS. 4A and 4B were discussed above as alternatives to each other, in some embodiments, both processes described in connection with FIGS. 4A and 4B may be implemented at the same time.

The blocks, related functions, and information exchanges described above by means of FIGS. 2, 3, 4A and 4B are in no absolute chronological order, and some of them may be performed simultaneously or in an order differing from the given one. In some embodiments, some of the steps may be neglected, for example, if the relevant information (e.g., a configuration) is already available (e.g., stored to a memory).

Figure 5:
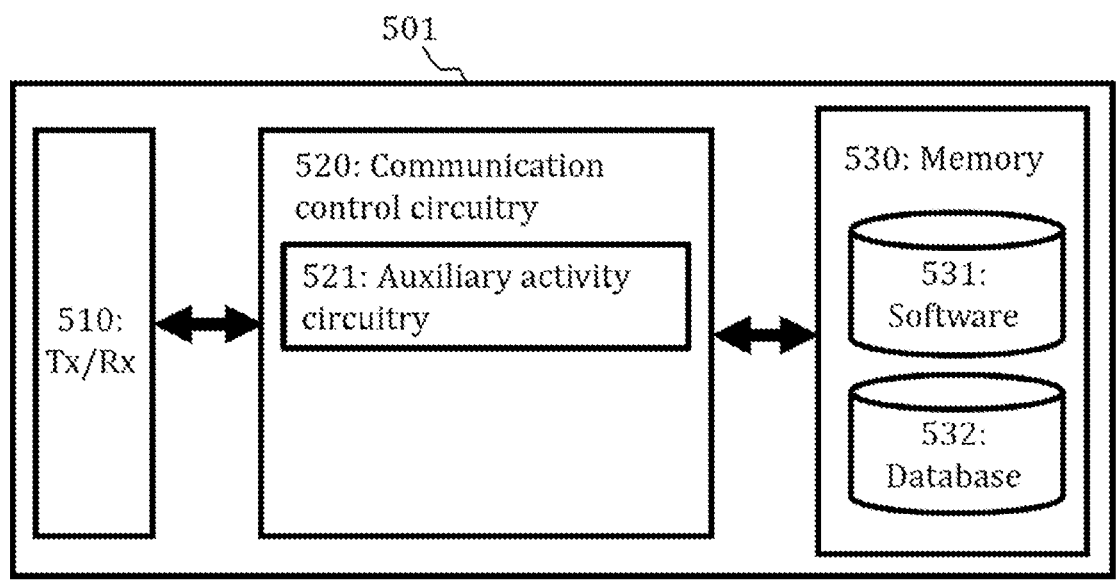
FIG. 5 illustrates an apparatus according to an embodiment.

FIG. 5 illustrates an apparatus 501 configured to carry out the functions described above in connection with a first and/or second radio device such as the first and/or second radio device 101, 102 of FIG. 1 and/or the first and/or second radio device shown in any of FIGS. 2 and 3. The apparatus may be an electronic device comprising electronic circuitries. The apparatus may be a separate network entity or a plurality of separate entities. The apparatus may comprise a communication control circuitry 520, such as at least one processor, and at least one memory 530 including a computer program code (software) 531 wherein the at least one memory and the computer program code (software) are configured, with the at least one processor, to cause the apparatus to carry out any one of the embodiments of the first radio device and/or second radio device described above.

The memory 530 may comprise a database 532 which may maintain, for example, measurement latencies of radio devices (e.g., its own measurement latency and/or measurement latencies of one or more other radio devices), measurement uncertainties of radio devices (e.g., its own measurement uncertainty and/or measurement uncertainty of one or more other radio devices), timestamps, definitions of auxiliary activities (e.g., configuration parameters) and/or identifiers of radio devices, as described in previous embodiments. The memory 530 may also comprise other databases which may not be related to the described functionalities according to embodiments.

The memory 530 of the apparatus 510 may be implemented using any suitable data storage technology, such as semiconductor based memory devices, flash memory, magnetic memory devices and systems, optical memory devices and systems, fixed memory and removable memory.

Referring to FIG. 5, the communication control circuitry 520 may comprise connectionless communication circuitry 521. The auxiliary activity circuitry 521 may be configured, for example, to carry out at least some of actions pertaining to any of elements illustrated in any of FIGS. 2, 3, 4A and 4B.

The apparatus 501 may further comprise communication interfaces (Tx/Rx) 510 comprising hardware and/or software for realizing communication connectivity according to one or more communication protocols such as at least one communication protocol enabling connectionless communication using a connectionless mode. The communication interface may provide the apparatus with communication capabilities to communicate in the cellular communication system and enable communication, for example, with network nodes and radio devices (or radio devices). The communication interface 510 may comprise standard well-known components such as an amplifier, filter, frequency-converter, (de)modulator, and encoder/decoder circuitries and one or more antennas. The communication interface 510 may comprise radio interface components providing the apparatus with radio communication capability in the cell.

As used in this application, the term "circuitry may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In an embodiment, at least some of the processes described in connection with FIGS. 2, 3, 4A and 4B may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2, 3, 4A and 4B or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may, additionally or alternatively, be carried out in the form of a computer process defined by a computer program or portions thereof. Embodiments of the methods described in connection with FIGS. 2, 3, 4A and 4B may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A first radio device comprising:
   at least one processor; and
   at least one memory including a computer program code, wherein the at least one memory and the computer program code are configured, with the at least one processor, to cause the first radio device to perform:
   transmitting, using a connectionless mode of the first radio device, an advertising message;
   receiving, from a second radio device at a second reception time instance measured by the first radio device using the connectionless mode, a scan request requesting transmission of a scan response, wherein the second radio device is a device which received the advertising message;
   transmitting, to the second radio device, the scan response using the connectionless mode; and
   performing an auxiliary activity involving wireless communication between the first and second radio devices, wherein the performing of the auxiliary activity is initiated at a first starting time defined to occur at a pre-defined time interval following an anchor point corresponding to the second reception time instance or to a subsequent timestamp generated in response to the receiving of the scan request at the second reception time instance.

2. The first radio device according to claim 1, wherein the at least one memory and the computer program code are configured to, with the at least one processor, cause the first radio device perform:
maintaining, in a memory of the at least one memory, information comprising one or more of
at least one expected measurement latency of at least one reception time measurement defining the anchor point of the first radio device and/or defining an anchor point of the second radio device for timing start of the auxiliary activity,
at least one expected measurement uncertainty of at least one reception time measurement defining the anchor point of the first radio device and/or defining the anchor point of the second radio device for timing start of the auxiliary activity,
at least one time interval between the anchor point of the first radio device and the first starting time of the auxiliary activity for the first radio device and/or between the anchor point of the second radio device and a second starting time of the auxiliary activity for the second radio device,
a first transmission time instance measured by the first radio device and corresponding to the transmission of the advertising message and/or
a third transmission time instance measured by the first radio device and corresponding to the transmission of the scan response; and
adjusting, before the initiating of the auxiliary activity, the first starting time of the auxiliary activity and/or a tolerance of the first starting time based on said information for ensuring synchronized operation.

3. The first radio device according to claim 1, wherein the at least one memory and the computer program code are configured to, with the at least one processor, cause the first radio device to perform the auxiliary activity by at least:
transmitting one or more first auxiliary messages to the second radio device; and/or
receiving one or more second auxiliary messages from the second radio device.

4. The first radio device according to claim 1, wherein the at least one memory and the computer program code are configured to, with the at least one processor, cause the first radio device further to perform:
generating, in response to the receiving of the scan request, a scan request received event, wherein the second reception time instance is measured by the first radio device by recording a timestamp of the scan request received event.

5. The first radio device according to claim 1, wherein the advertising message and/or the scan response comprises an identifier of the first radio device and the scan request comprises an identifier of the second radio device and the at least one memory and the computer program code are configured to, with the at least one processor, cause the first radio device further, in response to the receiving of the scan request, to perform:
generating a common identifier for a pair formed by the first and second radio devices based at least on the identifiers of the first and second radio devices; and
performing at least one of the following actions:
including the common identifier in the scan response,
transmitting one or more first auxiliary messages transmitted to the second radio device as a part of the auxiliary activity, wherein the one or more first auxiliary messages comprise the common identifier and
receiving one or more second auxiliary messages comprising the common identifier from the second radio device as a part of the auxiliary activity and verifying the one or more second auxiliary messages based on the generated common identifier.

6. The first radio device according to claim 1, wherein the advertising message and/or the scan response comprises an identifier of the first radio device and the scan request comprises an identifier of the second radio device and the at least one memory and the computer program code are configured to, with the at least one processor, cause the first radio device further to perform:
generating, in response to the receiving of the scan request, a common identifier for a pair formed by the first and second radio devices based at least on the identifiers of the first and second radio devices; and
selecting one or more transmission characteristics of the first radio device for performing the auxiliary activity based on the common identifier.

7. The first radio device according to claim 1, wherein the first and second radio devices are devices supporting a first wireless communication protocol and the advertising message, the scan request, the scan response and any auxiliary messages involved in the auxiliary activity correspond to advertising protocol data units of said first wireless communication protocol, the auxiliary activity being auxiliary to primary operation of the first wireless communication protocol.

8. The first radio device according to claim 7, wherein the first wireless communication protocol is Bluetooth Low Energy protocol.

9. A second radio device comprising:
at least one processor; and
at least one memory including a computer program code, wherein the at least one memory and the computer program code are configured, with the at least one processor, to cause the second radio device to perform:
scanning for advertising messages from radio devices within a scanning range of a connectionless mode of the second radio device using a connectionless mode of the second radio device;
during the scanning, receiving an advertising message from a first radio device at a first reception time instance measured by the second radio device;
transmitting, to the first radio device, a scan request requesting transmission of a scan response using the connectionless mode;
receiving, from the first radio device, the scan response at a third reception time instance measured by the second radio device using the connectionless mode; and
performing an auxiliary activity involving wireless communication between the first and second radio devices, wherein the performing of the auxiliary activity is initiated at a second starting time defined to occur at a pre-defined time interval following an anchor point corresponding to the first reception time instance, to a subsequent timestamp generated in response to the receiving of the advertising message at the first reception time instance, to the third reception time instance or to a subsequent timestamp generated in response to the receiving of the scan response at the third reception time instance.

10. The second radio device according to claim 9, wherein the at least one memory and the computer program code are configured to, with the at least one processor, cause the second radio device are further to perform:
maintaining, in a memory of the at least one memory, information comprising one or more of
at least one expected measurement latency of at least one reception time measurement defining the anchor point of the first radio device and/or defining an anchor point of the second radio device for timing start of the auxiliary activity,
at least one expected measurement uncertainty of at least one reception time measurement defining the anchor point of the first radio device and/or defining the anchor point of the second radio device for timing start of the auxiliary activity,
at least one time interval between the anchor point of the first radio device and a first starting time of the auxiliary activity for the first radio device and/or between the anchor point of the second radio device and the second starting time of the auxiliary activity for the second radio device and/or
a second transmission time instance measured by the second radio device and corresponding to the transmission of the scan request; and
adjusting, before the initiating of the auxiliary activity, the second starting time of the auxiliary activity and/or a tolerance of the second starting time of the auxiliary activity based on said information for ensuring synchronized operation.

11. The second radio device according to claim 9, wherein the at least one memory and the computer program code are configured to, with the at least one processor, cause the second radio device to perform the auxiliary activity by at least:
receiving one or more first auxiliary messages from the first radio device; and/or
transmitting one or more second auxiliary messages to the first radio device.

12. The second radio device according to claim 9, wherein the at least one memory and the computer program code are configured to, with the at least one processor, cause the second radio device further to perform:
generating, in response to the receiving of the advertising message, a first advertising report, wherein the first reception time instance is measured by the second radio device by recording a timestamp of the first advertising report; and
generating, in response to the receiving of the scan response, a second advertising report, wherein the third reception time instance is measured by the second radio device by recording a timestamp of the second advertising report.

13. The second radio device according to claim 9, wherein the advertising message and/or the scan response comprises an identifier of the first radio device and the scan request comprises an identifier of the second radio device and the at least one memory and the computer program code are configured to, with the at least one processor, cause the second radio device further, in response to the receiving of the advertising message, to perform:
generating a common identifier for a pair formed by the first and second radio devices based at least on the identifiers of the first and second radio devices; and
performing at least one of the following actions:
transmitting one or more second auxiliary messages to the first radio device as a part of the auxiliary activity, wherein the one or more second auxiliary messages comprise the common identifier; and
receiving one or more first auxiliary messages comprising the common identifier from the first radio device as a part of the auxiliary activity and verifying the one or more first auxiliary messages based on the generated common identifier.

14. The second radio device according to claim 9, wherein the advertising message and/or the scan response comprises an identifier of the first radio device and the scan request comprises an identifier of the second radio device and the at least one memory and the computer program code are configured to, with the at least one processor, cause the second radio device further to perform:
generating, in response to the receiving of the scan request, a common identifier for a pair formed by the first and second radio devices based at least on the identifiers of the first and second radio devices; and
selecting one or more transmission characteristics of the second radio device for performing the auxiliary activity based on the common identifier.

15. The second radio device according to claim 9, wherein the first and second radio devices are devices supporting a first wireless communication protocol and the advertising message, the scan request, the scan response and any auxiliary messages involved in the auxiliary activity correspond to advertising protocol data units of said first wireless communication protocol, the auxiliary activity being auxiliary to primary operation of the first wireless communication protocol.

16. The second radio device according to claim 15, wherein the first wireless communication protocol is Bluetooth Low Energy protocol.

17. A method comprising:
transmitting, using a connectionless mode of a first radio device, an advertising message;
receiving, from a second radio device at a second reception time instance measured by the first radio device using the connectionless mode, a scan request requesting transmission of a scan response, wherein the second radio device is a device which received the advertising message;
transmitting, to the second radio device, the scan response using the connectionless mode; and
performing an auxiliary activity involving wireless communication between the first and second radio devices, wherein the performing of the auxiliary activity is initiated at a first starting time defined to occur at a pre-defined time interval following an anchor point corresponding to the second reception time instance or to a subsequent timestamp generated in response to the receiving of the scan request at the second reception time instance.

18. A method comprising:
scanning for advertising messages from radio devices within a scanning range of a connectionless mode of a second radio device using a connectionless mode of the second radio device;
during the scanning, receiving an advertising message from a first radio device at a first reception time instance measured by the second radio device;
transmitting, to the first radio device, a scan request requesting transmission of a scan response using the connectionless mode;

receiving, from the first radio device, the scan response at a third reception time instance measured by the second radio device using the connectionless mode; and performing an auxiliary activity involving wireless communication between the first and second radio devices, wherein the performing of the auxiliary activity is initiated at a second starting time defined to occur at a pre-defined time interval following an anchor point corresponding to the first reception time instance, to a subsequent timestamp generated in response to the receiving of the advertising message at the first reception time instance, to the third reception time instance or to a subsequent timestamp generated in response to the receiving of the scan response at the third reception time instance.

19. A non-transitory computer readable medium having stored thereon instructions that, when executed by a computer, cause the computer to perform at least the following:

transmitting, using a connectionless mode of a first radio device, an advertising message;

receiving, from a second radio device at a second reception time instance measured by the first radio device using the connectionless mode, a scan request requesting transmission of a scan response, wherein the second radio device is a device which received the advertising message;

transmitting, to the second radio device, the scan response using the connectionless mode; and performing an auxiliary activity involving wireless communication between the first and second radio devices, wherein the performing of the auxiliary activity is initiated at a first starting time defined to occur at a pre-defined time interval following an anchor point corresponding to the second reception time instance or to a subsequent timestamp generated in response to the receiving of the scan request at the second reception time instance.

20. A non-transitory computer readable medium having stored thereon instructions that, when executed by a computer, cause the computer to perform at least the following:

scanning for advertising messages from radio devices within a scanning range of a connectionless mode of a second radio device using a connectionless mode of the second radio device;

during the scanning, receiving an advertising message from a first radio device at a first reception time instance measured by the second radio device;

transmitting, to the first radio device, a scan request requesting transmission of a scan response using the connectionless mode;

receiving, from the first radio device, the scan response at a third reception time instance measured by the second radio device using the connectionless mode; and performing an auxiliary activity involving wireless communication between the first and second radio devices, wherein the performing of the auxiliary activity is initiated at a second starting time defined to occur at a pre-defined time interval following an anchor point corresponding to the first reception time instance, to a subsequent timestamp generated in response to the receiving of the advertising message at the first reception time instance, to the third reception time instance or to a subsequent timestamp generated in response to the receiving of the scan response at the third reception time instance.

\* \* \* \* \*